United States Patent
Valzasina et al.

(10) Patent No.: US 10,180,324 B2
(45) Date of Patent: Jan. 15, 2019

(54) MICROELECTROMECHANICAL GYROSCOPE WITH REJECTION OF DISTURBANCES AND METHOD OF SENSING AN ANGULAR RATE

(71) Applicants: STMICROELECTRONICS S.R.L., Agrate Brianza (IT); STMICROELECTRONICS, INC., Coppell, TX (US); STMICROELECTRONICS INTERNATIONAL N.V., Schiphol (NL)

(72) Inventors: Carlo Valzasina, Gessate (IT); Huantong Zhang, Coppell, TX (US); Matteo Fabio Brunetto, Garbagnate Milanese (IT); Gert Ingvar Andersson, Lindome (SE); Erik Daniel Svensson, Kista (SE); Nils Einar Hedenstierna, Vastra Folunda (SE)

(73) Assignees: STMicroelectronics S.r.l., Agrate Brianza (IT); STMicroelectronics, Inc., Coppell, TX (US); STMicroelectronics International NV, Plan les Ouates (CH)

( * ) Notice: Subject to any disclaimer, the term of this patent is extended or adjusted under 35 U.S.C. 154(b) by 211 days.

(21) Appl. No.: 15/197,414

(22) Filed: Jun. 29, 2016

(65) Prior Publication Data
US 2017/0184400 A1 Jun. 29, 2017

(30) Foreign Application Priority Data
Dec. 29, 2015 (IT) .................. 102015000088650

(51) Int. Cl.
*G01C 19/56* (2012.01)
*G01P 9/04* (2006.01)
(Continued)

(52) U.S. Cl.
CPC ....... *G01C 19/5776* (2013.01); *G01C 19/574* (2013.01); *G01C 19/5719* (2013.01)

(58) Field of Classification Search
CPC ............ G01C 19/5776; G01C 19/5747; G01C 19/5733; G01C 19/574; G01C 19/5719
See application file for complete search history.

(56) References Cited

U.S. PATENT DOCUMENTS

| 6,089,089 A * | 7/2000 | Hsu ..................... G01C 19/5719 73/1.77 |
| 6,321,598 B1 * | 11/2001 | Iwaki ................. G01C 19/5719 73/504.02 |

(Continued)

*Primary Examiner* — Helen Kwok
(74) *Attorney, Agent, or Firm* — Seed Intellectual Property Law Group LLP

(57) ABSTRACT

A gyroscope includes a substrate, a first structure, a second structure and a third structure elastically coupled to the substrate and movable along a first axis. The first and second structure are arranged at opposite sides of the third structure with respect to the first axis A driving system is configured to oscillate the first and second structure along the first axis in phase with one another and in phase opposition with the third structure. The first, second and third structure are provided with respective sets of sensing electrodes, configured to be displaced along a second axis perpendicular to the first axis in response to rotations of the substrate about a third axis perpendicular to the first axis and to the second axis.

20 Claims, 9 Drawing Sheets

(51) Int. Cl.
*G01C 19/574* (2012.01)
*G01C 19/5719* (2012.01)
*G01C 19/5776* (2012.01)

(56) References Cited

U.S. PATENT DOCUMENTS

| | | | | |
|---|---|---|---|---|
| 6,691,571 | B2* | 2/2004 | Willig | G01C 19/5747 |
| | | | | 73/504.12 |
| 9,068,834 | B2* | 6/2015 | Gunthner | G01C 19/574 |
| 9,869,550 | B2* | 1/2018 | Prati | G01C 19/5747 |
| 2003/0131664 | A1* | 7/2003 | Mochida | G01C 19/5719 |
| | | | | 73/504.12 |
| 2005/0229703 | A1* | 10/2005 | Geen | G01C 19/5719 |
| | | | | 73/510 |
| 2006/0230830 | A1 | 10/2006 | Geen et al. | |
| 2006/0272411 | A1* | 12/2006 | Acar | G01C 19/5712 |
| | | | | 73/504.04 |
| 2007/0131030 | A1* | 6/2007 | Jeong | G01C 19/5747 |
| | | | | 73/504.12 |
| 2010/0116050 | A1* | 5/2010 | Wolfram | G01C 19/574 |
| | | | | 73/504.12 |
| 2010/0313657 | A1 | 12/2010 | Trusov et al. | |
| 2012/0013355 | A1* | 1/2012 | Narita | G01C 19/574 |
| | | | | 324/679 |
| 2014/0116135 | A1* | 5/2014 | Cazzaniga | G01C 19/5747 |
| | | | | 73/504.12 |
| 2015/0330783 | A1 | 11/2015 | Rocchi et al. | |

* cited by examiner

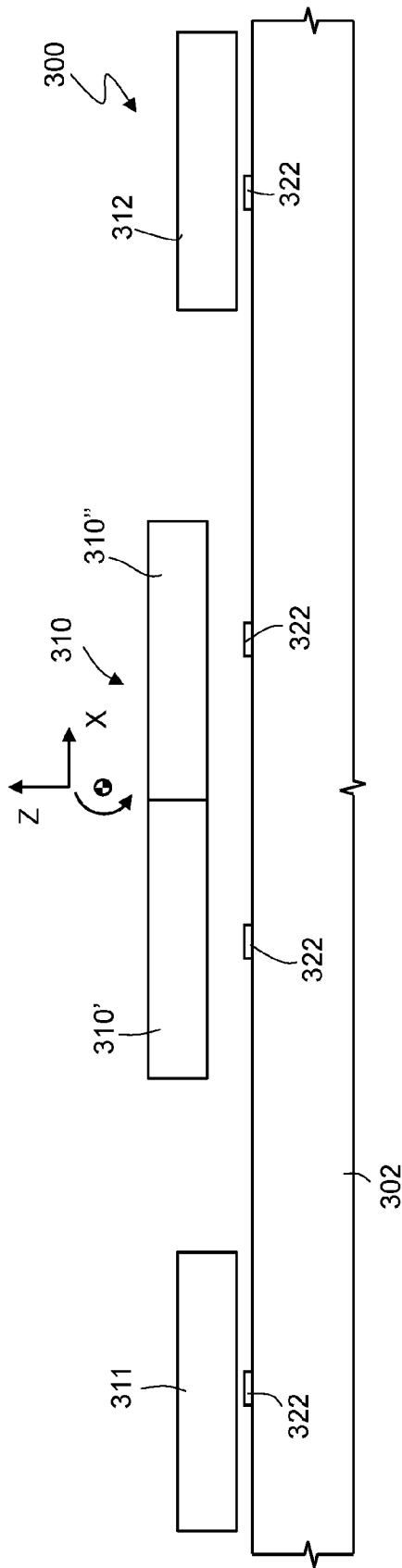
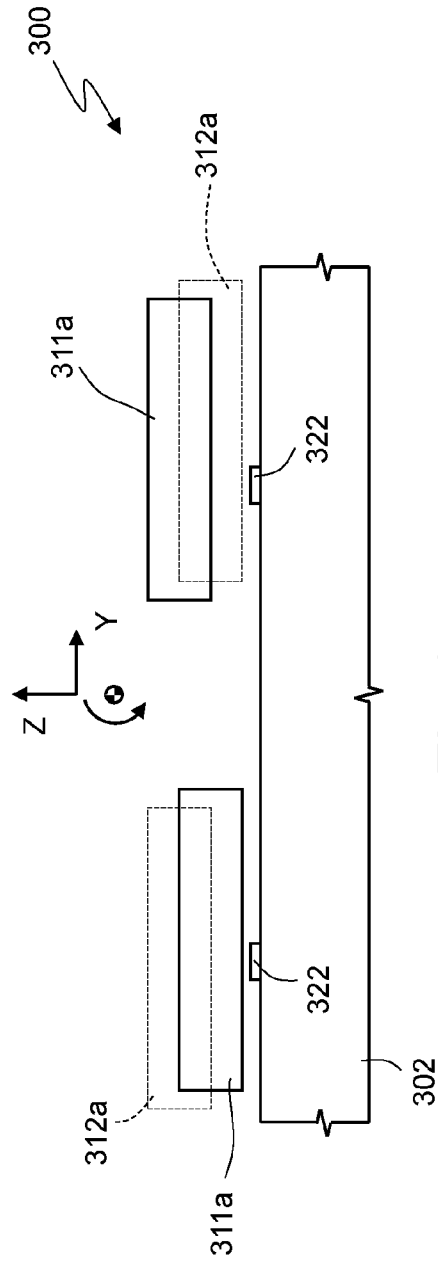

MICROELECTROMECHANICAL GYROSCOPE WITH REJECTION OF DISTURBANCES AND METHOD OF SENSING AN ANGULAR RATE

BACKGROUND

Technical Field

The present disclosure relates to a microelectromechanical gyroscope with rejection of disturbances and to a method of sensing an angular rate.

Description of the Related Art

As is known, use of microelectromechanical systems is increasingly widespread in various sectors of technology and has yielded encouraging results especially in the production of inertial sensors, microintegrated gyroscopes, and electromechanical oscillators for a wide range of applications.

In particular, several types of MEMS gyroscopes are available, which are distinguished by their rather complex electromechanical structure and by the operating mode, but are in any case based upon detection of Coriolis accelerations. In MEMS gyroscopes of this type, a mass (or a system of masses) is elastically constrained to a substrate or stator to be able to translate in a driving direction and a sensing direction that are mutually perpendicular. By a control device, the mass is set in oscillation at a controlled frequency and amplitude in the driving direction.

When the gyroscope turns about an axis perpendicular to the driving direction and to the sensing direction at an angular rate, on account of the motion in the driving direction the mass is subject to a Coriolis force and moves in the sensing direction. The displacements of the mass in the sensing direction are determined both by the angular rate and by the velocity in the driving direction and may be converted into electrical signals. For instance, the mass and the substrate may be capacitively coupled so that the capacitance depends upon the position of the mass with respect to the substrate. The displacements of the mass in the sensing direction may thus be detected in the form of electrical signals modulated in amplitude in a way proportional to the angular rate, with carrier at the frequency of oscillation of the driving mass. Use of a demodulator makes it possible to obtain the modulating signal thus to derive the instantaneous angular rate.

In many cases, however, the acceleration signal that carries information regarding the instantaneous angular rate also contains disturbances in the form of spurious components that are not determined by the Coriolis acceleration. For example, vibrations that propagate to the substrate or external forces applied thereto may cause displacements of the mass in the sensing direction or disturb the driving action. Both events may result in the detection of an angular rate and an altered output signal, even though the substrate has not undergone any rotation, actually.

Rejection of spurious components is a general issue and may be particularly critical for some applications, such as in automotive. By way of example, in a vehicle travelling along a straight path, the output of a gyroscope may be affected by vibrations or shocks caused by uneven road surface. These disturbances do not correspond to real rotations of the substrate of the gyroscope, which may be rigidly coupled to the chassis of the vehicle, but the output signal may reflect spurious components and indicate an incorrect angular rate.

Several solutions have been proposed, generally aiming at reducing sensitivity to external disturbances. Many of these solutions proved to be quite reliable in rejecting unwanted effects of disturbing linear accelerations and of disturbing angular accelerations about rotation axes which lie in a gyroscope plane defined by the driving direction and the sensing direction. Instead, rotational accelerations about axes perpendicular to the gyroscope plane may directly affect the displacement of the mass in the sensing in-plane direction, thus disturbing the accuracy of the external angular rate measurement desired in automotive applications.

BRIEF SUMMARY

At least some embodiments of the present disclosure provide a microelectromechanical gyroscope and a method of sensing an angular rate which allow the above described limitations to be overcome or at least attenuated.

BRIEF DESCRIPTION OF THE SEVERAL VIEWS OF THE FIGURES

For a better understanding of the disclosure, some embodiments thereof will now be described, purely by way of non-limiting example and with reference to the attached drawings, wherein:

FIG. 13 is a cross section through the gyroscope of FIG. 12, taken along the line XIII-XIII of FIG. 12;

FIG. 14 is a cross section through the gyroscope of FIG. 12, taken along the line XIV-XIV of FIG. 12.

DETAILED DESCRIPTION

Figure 1:
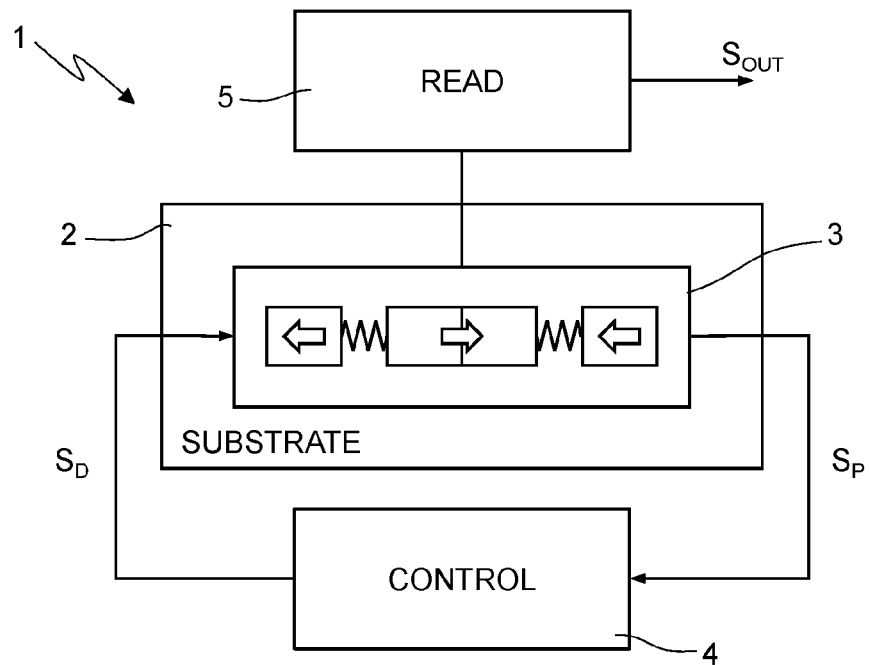
FIG. 1 is a simplified block diagram of a microelectromechanical gyroscope according to an embodiment of the present disclosure.

With reference to FIG. 1, a microelectromechanical gyroscope according to an embodiment of the present disclosure is designated as a whole by number 1 and comprises a substrate 2, a microstructure 3, a control device 4, and a read device 5. As explained in detail hereinafter, the microstructure 3 comprises movable parts and parts that are fixed with respect to the substrate 2. The control device 4 forms a control loop with the microstructure 3 and is configured to keep movable parts of the microstructure 3 in oscillation with respect to the substrate with controlled frequency and amplitude. For this purpose, the control device 4 receives position signals Sp from the microstructure 3 and supplies driving signals $S_D$ to the microstructure 3. The read device 5 supplies output signals $S_{OUT}$ as a function of the movement of the movable parts of the microstructure 3. The output signals $S_{OUT}$ indicate an angular rate of the substrate 2 with respect to at least one gyroscopic axis of rotation. In the embodiment of FIG. 1, the gyroscope 1 is a single-axis gyroscope.

Figure 2:
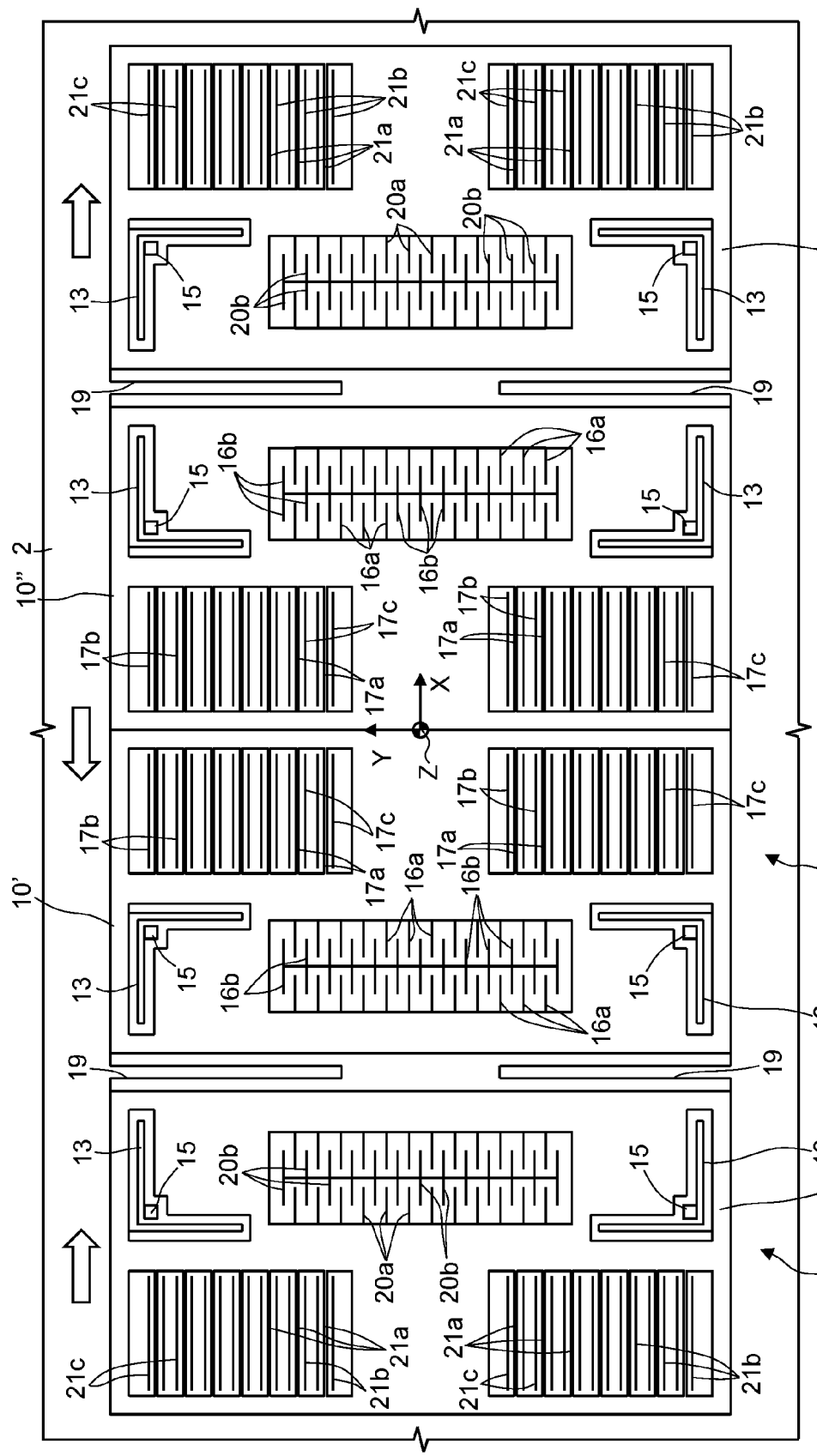
FIG. 2 is a simplified top plan view of a portion of the microelectromechanical gyroscope of FIG. 1.

FIG. 2 show the substrate 2 and, in greater detail, the microstructure 3 according to one embodiment of the disclosure. The microstructure 3 is substatially planar and, at rest, lies parallel to a gyroscope plane XY defined by a first axis X, that also defines a driving direction, and a second axis Y, that also defines a sensing direction. The first axis X and the second axis Y are mutually perpendicular. The gyroscopic axis of rotation is parallel to a third axis Z and is perpendicular to both the first axis X and the second axis Y.

In one embodiment, the microstructure comprises a system of movable masses, sets of fixed and movable driving electrodes and sets of fixed and movable sensing electrodes. Here and in the following, the terms "fixed" and "movable" are to be understood with respect to the substrate 2, which defines a stator of the gyroscope 1.

Additional sets of fixed and movable electrodes (not shown in the drawings) may be optionally provided for the purpose of sensing the position of the masses along the driving direction and controlling frequency and amplitude of the driving oscillation accordingly.

The system of movable masses includes an inner mass 10, a first outer mass 11 and a second outer mass 12, which are symmetrically arranged at opposite sides of the inner mass 10. The inner mass 10 is in turn symmetric with respect to the second axis Y and has a first mass portion 10', adjacent to the first outer mass 11, and a second mass portion 10", adjacent to the second outer mass 12. For the sake of simplicity, the first axis X, the second axis Y and the third axis Z are defined as passing through the center of mass of the inner mass 10 (at least in a rest configuration).

The inner mass 10, the first outer mass 11 and the second outer mass 12 are elastically coupled to the substrate 2 through respective flexures 13 and anchorages 15. In one embodiment, the inner mass 10, the first outer mass 11 and the second outer mass 12 may be symmetric also with respect to the first axis X. The flexures 13 are configured to allow the first mass 10, the first outer mass 11 and the second outer mass 12 to oscillate in the driving direction along the first axis X and in the sensing direction along the second axis Y.

In one embodiment, the inner mass 10 is provided with two sets of movable driving electrodes 16a, one set for the first mass portion 10' and one set for the second mass portion 10". The movable driving electrodes 16a are capacitively coupled in a comb-fingered configuration with corresponding fixed or stator driving electrodes 16b on the substrate 2 and are arranged symmetrically with respect to both the first axis X and the second axis Y. The movable driving electrodes 16a and stator driving electrodes 16b are configured to oscillate the inner mass 10 in the driving direction along the first axis X in response to driving signals provided by the control device 4. In one embodiment, however, the inner mass could have a single set of movable and stator driving electrodes, even arranged asymmetrically with respect to the second axis Y, possibly.

Figure 3:
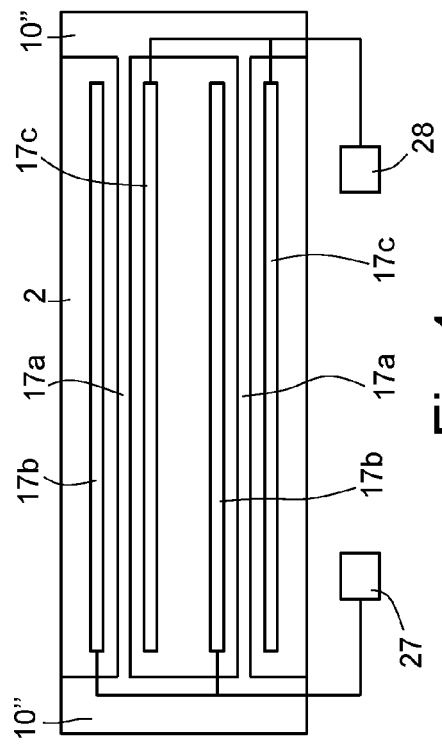
FIG. 3 is an enlarged view of a first detail of the gyroscope of FIG. 1.
Figure 4:
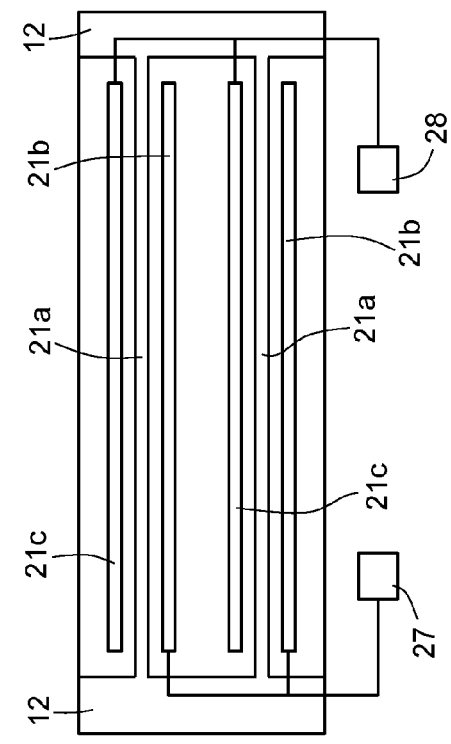
FIG. 4 is an enlarged view of a second detail of the gyroscope of FIG. 1.

The inner mass 10 comprises two sets of movable sensing electrodes 17a, one set for the first mass portion 10' and one set for the second mass portion 10" and each set possibly divided into subsets. The sets of movable sensing electrodes 17a are arranged symmetrically with respect to both the first axis X and the second axis Y. Moreover, each movable sensing electrode 17a extends parallel to the first axis X and is capacitively coupled in a parallel-plate configuration with a respective first fixed or stator sensing electrode 17b and a respective second fixed or stator sensing electrode 17c (see also FIGS. 3 and 4). Therefore, also the first stator sensing electrode 17b and the second stator sensing electrode 17c are parallel to the first axis X. The first stator sensing electrode 17b and the second stator sensing electrode 17c are arranged so that a first capacitance between each sensing electrode 17a and the respective first stator sensing electrode 17b increases and a second capacitance between each sensing electrode 17a and the respective second stator sensing electrode 17c decreases in response to displacements of the inner mass 10 (to which the sensing electrodes 17a are rigidly attached) along the second axis Y in the sensing direction; and so that the first capacitance decreases and the second capacitance increases in response to displacements of the inner mass 10 along the second axis Y opposite to the sensing direction. Moreover, the first stator sensing electrodes 17b and the second stator sensing electrodes 17c are electrically coupled to a first stator terminal 27 and to a second stator terminal 28, respectively (see also FIG. 7).

Turning to FIG. 2 again, the first outer mass 11 and the second outer mass 12 are symmetrically arranged at opposite sides of the inner mass 10. More precisely, the first outer mass 11 and the second outer mass 12 are symmetric with respect to one another relative to the second axis Y (at least in a rest configuration of the microstructure 3). In one embodiment, the first outer mass 11 is also symmetric with respect to the first mass portion 10' and has the same structure as the second mass portion 10" of the inner mass 10; and the second outer mass 12 is symmetric with respect to the second mass portion 10" and has the same structure as the first mass portion 10' of the inner mass 10. Therefore, at least in the rest configuration, the whole microstructure 3 is symmetric with respect to the second axis Y.

The first outer mass 11 and the second outer mass 12 are elastically coupled to the inner mass 10 through flexures 19, which are configured to allow the first outer mass 11 and the second outer mass 12 to move relative to the inner mass 10 in the driving direction along the first axis X and in the sensing direction along the second axis Y. The first outer mass 11 and the second outer mass 12 may also slightly rotate relative to the inner mass 10.

The first outer mass 11 and the second outer mass 12 comprise respective sets of movable driving electrodes 20a and respective sets of movable sensing electrodes 21a.

The movable driving electrodes 20a are capacitively coupled in a comb-fingered configuration with corresponding fixed or stator driving electrodes 20b on the substrate 2. The movable driving electrodes 20a and stator driving electrodes 20b are configured to oscillate the first outer mass 11 and the second outer mass 12 in the driving direction along the first axis X in response to driving signals provided by the control device 4.

Figure 5:
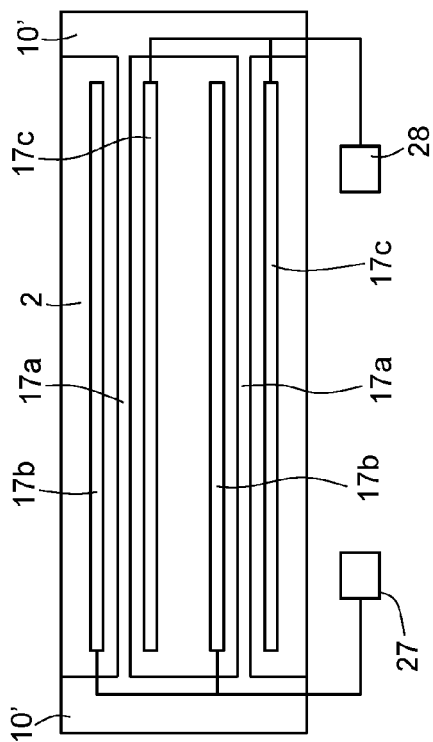
FIG. 5 is an enlarged view of a third detail of the gyroscope of FIG. 1.
Figure 6:
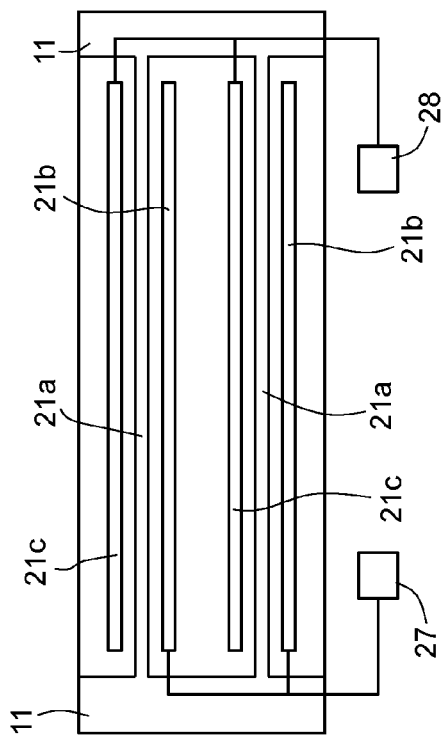
FIG. 6 is an enlarged view of a fourth detail of the gyroscope of FIG. 1.

In the first outer mass 11 and in the second outer mass 12, the respective sets of movable sensing electrodes 21a are arranged symmetrically with respect to the first axis X and may be divided into subsets. In one embodiment, however, the inner mass could have a single set of movable sensing electrodes coupled with respective first and second stator sensing electrodes. Moreover, each movable sensing electrode 21a extends parallel to the first axis X and is capacitively coupled in a parallel-plate configuration with a respective first fixed or stator sensing electrode 21b and a respective second fixed or stator sensing electrode 21c (see also FIGS. 5 and 6). Therefore, also the first stator sensing electrode 21b and the second stator sensing electrode 21c are parallel to the first axis X. The first stator sensing electrode 21b and the second stator sensing electrode 21c are arranged so that a third capacitance between each sensing electrode 21a and the respective first stator sensing electrode 21b increases and a fourth capacitance between each sensing electrode 21a and the respective second stator sensing electrode 21c decreases in response to displacements of the first outer mass 11 and the second outer mass 12 (to a respective of which the sensing electrodes 21a are rigidly attached) along the second axis Y opposite to the sensing direction; and so that the third capacitance decreases and the fourth capacitance increases in response to displacements of the first outer mass 11 and the second outer mass 12 along the second axis Y in the sensing direction. Moreover, the first stator sensing electrodes 21b and the second stator sensing electrodes 21c are electrically coupled to the first stator terminal 27 and to the second stator terminal 28, respectively.

The shape and size of the sensing electrodes 17a, 21a, of the first stator sensing electrodes 17b, 21b and of the second stator sensing electrodes 17c, 21c are selected so that, in the rest configuration, the overall capacitance between the masses 10, 11, 12 and the first stator sensing electrodes 17b, 21b balances the overall capacitance between the masses 10, 11, 12 and the second stator sensing electrodes 17c, 21c.

Figure 7:
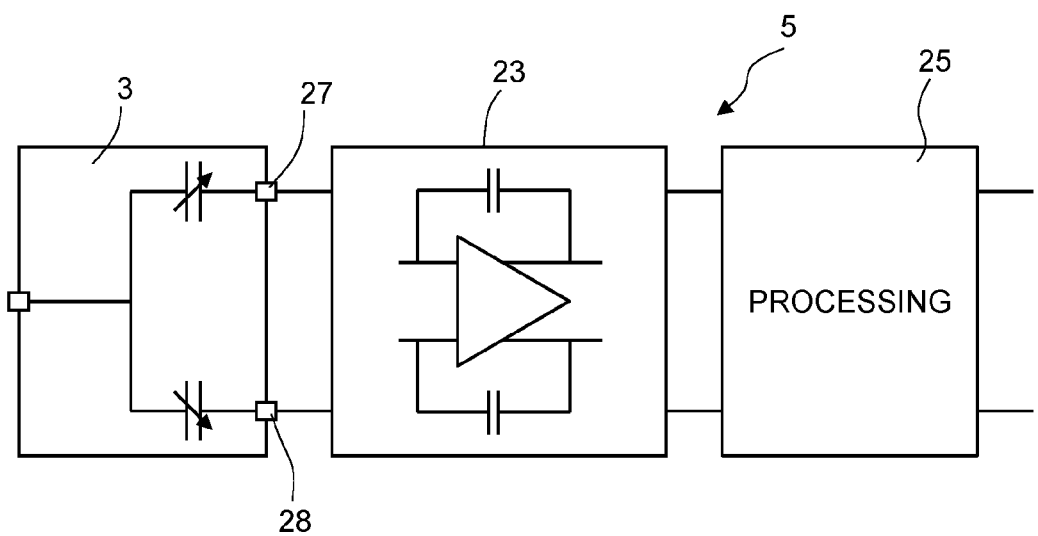
FIG. 7 is a simplified electrical diagram of a component of the gyroscope of FIG. 1.

With reference to FIG. 7, the read device 5 comprises a read interface 23 (which in one embodiment is a charge amplifier circuit) coupled to the microstructure 3 and a processing circuit 25 coupled to the read interface 23 and configured to provide the output signals $S_{OUT}$. The read interface 23 has a first differential input coupled to the first stator terminal 27 and a second differential input coupled to the second stator terminal 28. The read interface 23 is configured to sense a capacitance unbalance at the stator terminals 27, 28 and to feed the processing circuit 25 with a corresponding read signal.

Figure 8:
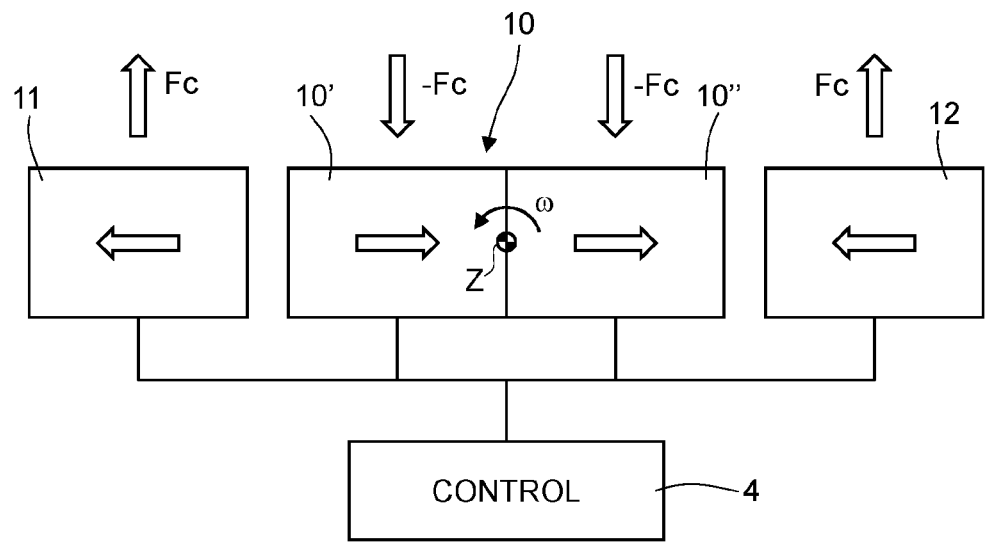
FIG. 8 is a schematic view of the gyroscope of FIG. 1 in a first operating condition.

As shown in FIG. 8, the control device 4 is configured to oscillate the inner mass 10 in the driving direction along the first axis with controlled amplitude and frequency. The control device 4 is also configured to oscillate the first outer mass 11 and the second outer mass 12 in phase with one another and in phase opposition with respect to the inner mass 10 (i.e. with a phase shift of 180°; horizontal arrows show the direction of motion, i.e. of the velocity, of each of the inner mass 10, the first outer mass 11 and the second outer mass 12). In practice, the microstructure 3 and the control device 4 form two so-called "beating-heart" structures (one formed by the first outer mass 11 and by the first mass portion 10' of the inner mass 10, and the other one formed by the second mass portion 10" of the inner mass 10 and by the second outer mass 12), adjacent portions of which (that is, the first and second mass portion 10', 10") are rigidly coupled to one another to form the inner mass 10. In one embodiment, however, the first and second mass portion 10', 10" may be elastically coupled to one another by flexures and maintained in a fixed relative position by the control device 4.

Accordingly, the first outer mass 11 and the second outer mass 12 experience equal Coriolis forces ($F_C$ in FIG. 8) in the same direction in response to a rotation of the substrate 2 about an axis perpendicular to the plane XY (e.g. about the third axis Z) with an angular rate ω. Vice versa, Coriolis force applied to the inner mass 10 is in the opposite direction with respect to Coriolis forces applied to the first outer mass 11 and second outer mass 12 ($-F_C$ in FIG. 8), because the driving motion is in phase opposition. Thus, in view of the arrangement of the first stator sensing electrodes 17b, 21b and second stator sensing electrodes 17c, 21c capacitance contributions caused by the displacements of the inner mass 10, the first outer mass 11 and the second outer mass 12 add up to build an overall capacitive unbalance that is sensed by the read interface 23. In fact, all the movable sensing electrodes 17a, 21a tend to move either toward the respective first stator sensing electrodes 17b, 21b and away from the respective second stator sensing electrodes 17c, 21c, or toward the respective second stator sensing electrodes 17c, 21c and away from the respective first stator sensing electrodes 17b, 21b.

Figure 9:
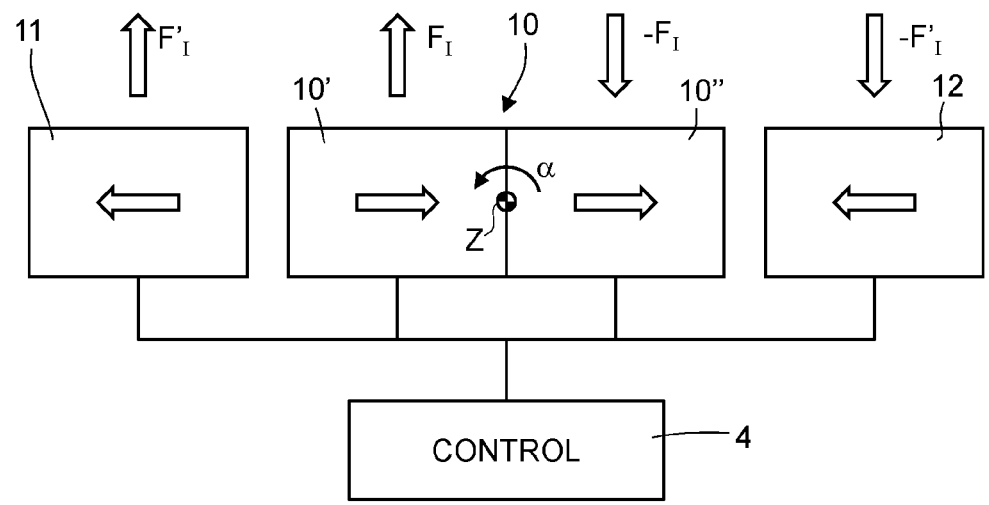
FIG. 9 is a schematic view of the gyroscope of FIG. 1 in a first operating condition.

On the contrary, on account of inertia, angular accelerations (about the third axis Z cause displacement of the first outer mass 10 and of the second outer mass 11 in opposite directions along the second axis Y (see FIG. 9 and inertia forces $F_I$, $F_I'$ applied to the first portion 10' of the inner mass 10 and to the first outer mass 11 and opposite inertia forces $-F_I$, $-F_I'$ applied to the second portion 10" of the inner mass 10 and to the second outer mass 12), while the inner mass 10 tend to rotate about its center of mass (i.e. about the third axis Z). It may be useful to tune properly the flexures linked to the sensing frames in order to get this in-phase sense movement mode at high frequency, far from operating frequencies of drive and Coriolis sense modes. Thus, in this case, the capacitance contributions caused by the displacements of the inner mass 10, the first outer mass 11 and the second outer mass 12 tend to cancel and the disturbance is effectively rejected. In fact, in the first mass portion 10' of the inner mass 10 the movable sensing electrodes 17a tend to move toward the respective first stator sensing electrodes 17b to the extent that in the second mass portion 10" movable sensing electrodes 17a tend to move away from the respective first stator sensing electrodes 17b, and vice versa. Likewise, in the first outer mass 11 the movable sensing electrodes 21a tend to move toward the respective first stator sensing electrodes 21b to the extent that in the second outer mass 12 movable sensing electrodes 21a tend to move away from the respective first stator sensing electrodes 21b, and vice versa. Thus, capacitive unbalance at any portion of the microstructure 3 is always compensated by opposite capacitive unbalance at a corresponding portion of the microstructure 3.

Figure 10:
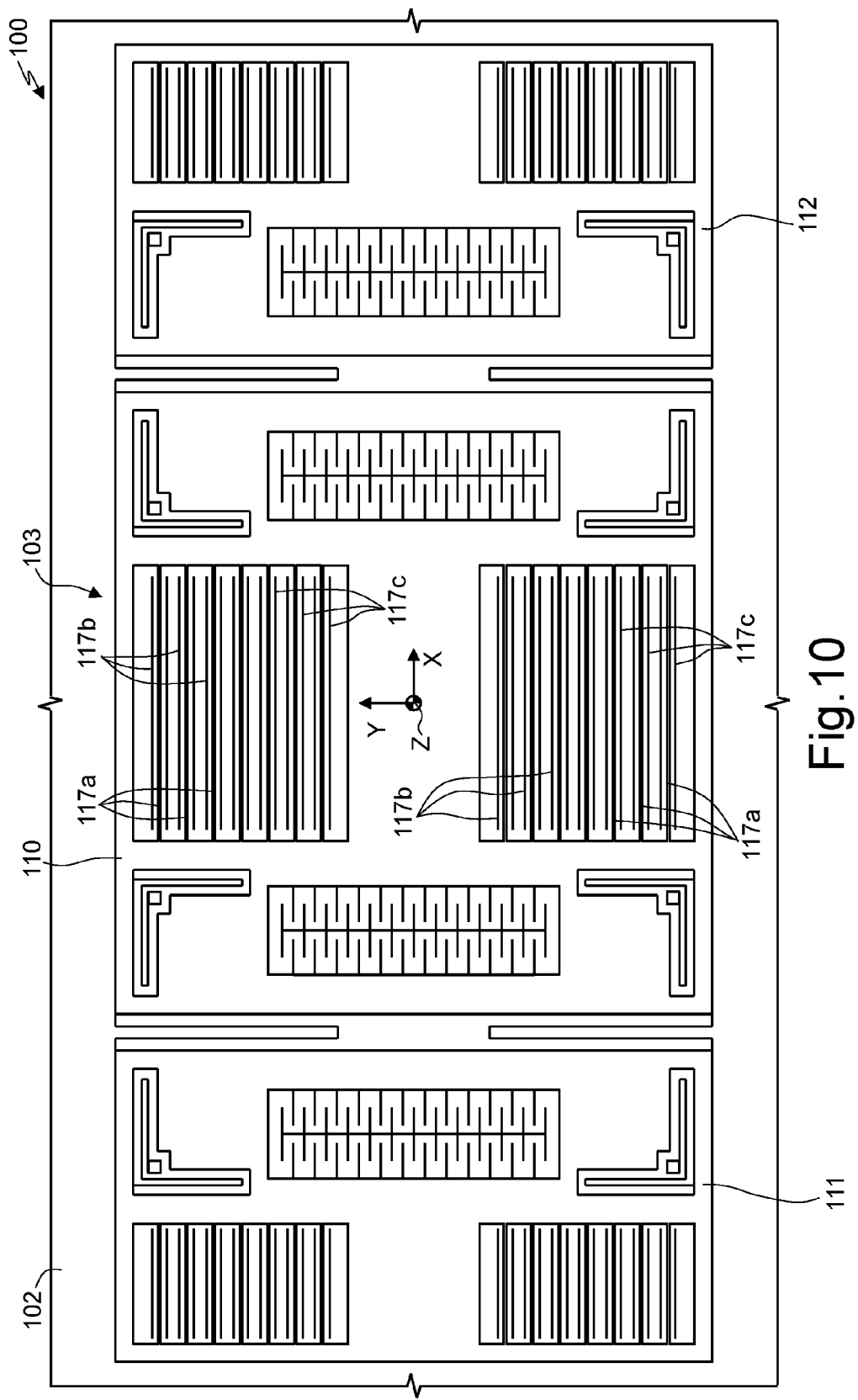
FIG. 10 is a simplified top plan view of a portion of a microelectromechanical gyroscope in accordance with another embodiment of the present disclosure.

FIG. 10 shows another embodiment, in which a microelectromechanical gyroscope 100 comprises a substrate 102 and a microstructure 103 having an inner mass 110, a first outer mass 111 and a second outer mass 112. The first outer mass 111 and the second outer mass 112 are the same as those already described with reference to FIG. 2. The inner mass 110 comprises a set of movable sensing electrodes 117a, each of which extends parallel to the first axis X and is symmetric with respect to the second axis Y (at least in a rest configuration). Each movable sensing electrode 117a is capacitively coupled to in a parallel-plate configuration with a respective first stator sensing electrode 117b and a respective second stator sensing electrode 117c. The first stator sensing electrodes 117b and the second stator sensing electrodes 117c are arranged so that a first capacitance between each sensing electrode 117a and the respective first stator sensing electrode 117b increases and a second capacitance between each sensing electrode 117a and the respective second stator sensing electrode 117c decreases in response to displacements of the inner mass 110 along the second axis Y in the sensing direction; and so that the first capacitance decreases and the second capacitance increases in response to displacements of the inner mass 110 along the second axis Y opposite to the sensing direction. Moreover, the first stator sensing electrodes 117b and the second stator sensing electrodes 117c are electrically coupled to a first stator terminal and to a second stator terminal (not shown), respectively, as in the embodiment of FIGS. 2-7.

Figure 11:
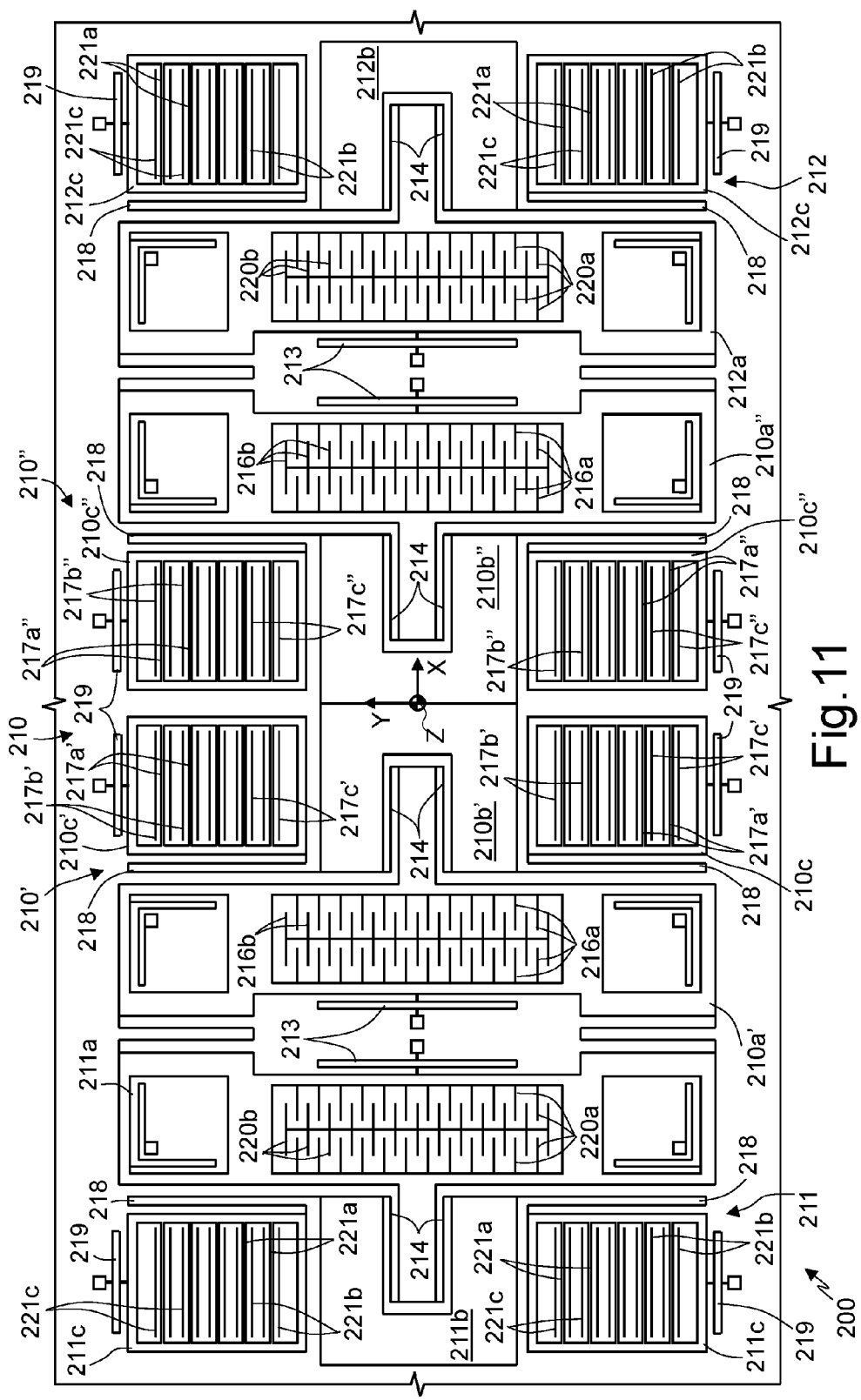
FIG. 11 is a simplified top plan view of a portion of a microelectromechanical gyroscope in accordance with another embodiment of the present disclosure.

Another embodiment of the disclosure is shown in FIG. 11. A microelectromechanical gyroscope 200 comprises a substrate 202 and a microstructure 203 having an inner mass 210, a first outer mass 211 and a second outer mass 212.

Each of a first mass portion 210' of the inner mass 210, a second mass portion 210" of the inner mass 210, the first outer mass 211 and the second outer mass 212 comprises at least three mass components, elastically coupled to one another, namely:

a driving frame, indicated as 210a', 210a", 211a, 212a for the first mass portion 210', the second mass portion 210", the first outer mass 211 and the second outer mass 212, respectively;

a sensing mass, indicated as 210b', 210b", 211b, 212b for the first mass portion 210', the second mass portion 210", the first outer mass 211 and the second outer mass 212, respectively;

at least one (two in the embodiment of FIG. 11) sensing frame indicated as 210c', 210c", 211c, 212c for the first mass portion 210', the second mass portion 210", the first outer mass 211 and the second outer mass 212, respectively.

The driving frames 210a', 210a", 211a, 212a are elastically coupled to the substrate 202 through flexures 213 to oscillate along the first axis X and support respective movable driving electrodes 216a (for the first mass portion 210' and the second mass portion 210") and 220a (for the first outer mass 211 and the second outer mass 212) in capacitive coupling with respective stator driving electrodes 216b, substantially as already described. The driving frames 210a', 210a", 211a, 212a do not need to be oscillatable in accordance with the second axis Y.

The sensing masses 210b', 210b", 211b, 212b are elastically coupled to the respective driving frames 210a', 210a", 211a, 212a through flexures 214 that allow one relative degree of freedom in the sensing direction in accordance with the second axis Y, while a rigid arrangement is defined in respect of motion in the driving direction along the first axis X. In other words, the sensing masses 210b', 210b", 211b, 212b move rigidly with the respective driving frames 210a', 210a", 211a, 212a in the driving direction, but can be displaced in the sensing direction.

The sensing frames 210c', 210c", 211c, 212c are elastically coupled to the respective sensing masses 210b', 210b", 211b, 212b through flexures 218 that allow one relative degree of freedom in the driving direction along the first axis X, while a rigid arrangement is defined in respect of motion in the sensing direction in accordance with the second axis Y. Moreover, the sensing frames 210c', 210c", 211c, 212c are elastically coupled to the substrate 202 through flexures 219 that allow motion with respect to the substrate 202 in the sensing direction, along the second axis Y. In other words, the sensing frames 210c', 210c", 211c, 212c move rigidly with the respective sensing masses 210b', 210b", 211b, 212b in the sensing direction, but can be displaced in the driving direction relative to the respective sensing masses 210b', 210b", 211b, 212b, since the sensing frames 210c', 210c", 211c, 212c do not need to be oscillatable in accordance with the first axis X.

The sensing frames 210c', 210c", 211c, 212c support respective sensing electrodes 217a (for the first mass portion 210' and the second mass portion 210") and 221a (for the first outer mass 211 and the second outer mass 212) in capacitive coupling with respective first stator sensing electrodes 217b, 221b and respective second stator sensing electrodes 217c, 221c, substantially as already described.

Separation and partial decoupling of the mass components of the inner mass 210, of the first outer mass 211 and of the second outer mass 212 allow to compensate for possible imperfections e.g. in the flexures, which may cause disturbances during the drive motion, such as quadrature errors. These disturbances are instead suppressed or at least attenuated by introducing elastic connections in place of rigid coupling between mass components.

Figure 12:
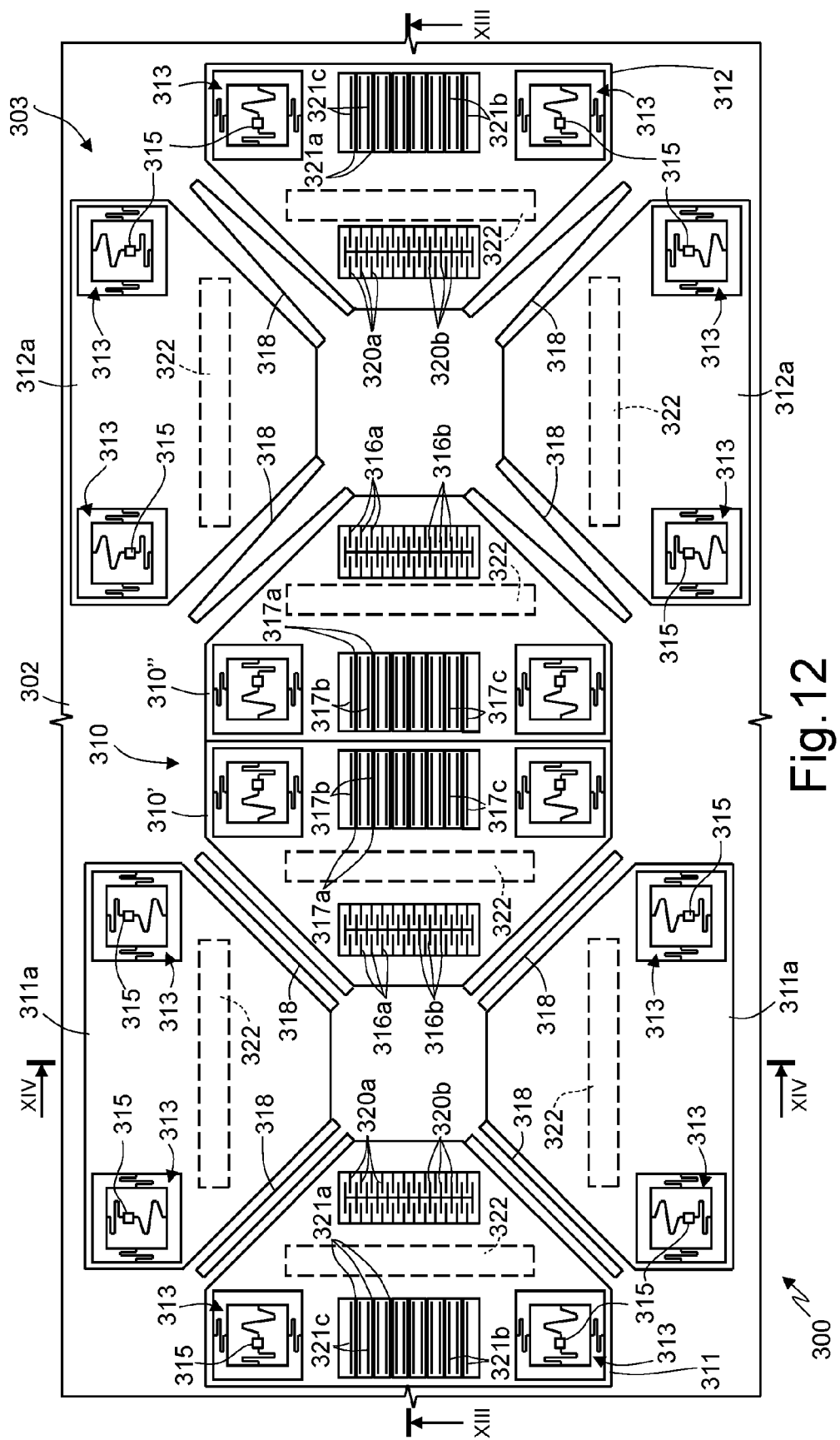
FIG. 12 is a simplified top plan view of a portion of a microelectromechanical gyroscope in accordance with another embodiment of the present disclosure.

According to an embodiment illustrated in FIG. 12, a microelectromechanical gyroscope 300 comprises a substrate 302 and a microstructure 303 having an inner mass 310, a first outer mass 311, a second outer mass 312. Moreover, the microstructure 303 comprises first additional masses 311a and second additional masses 312a.

In one embodiment, the inner mass has a first mass portion 310', which is symmetric to the first outer mass 311 with respect to an axis parallel to the second axis Y; and a second mass portion 310", which is symmetric to the second outer mass 312 with respect to an axis parallel to the second axis Y.

The inner mass 310 is provided with sets of movable driving electrodes 316a, arranged symmetrically with respect to the second axis Y and coupled to respective stator driving electrodes 316b. The driving electrodes 316a, 316b are configured to move the inner mass 310 in the driving direction along the first axis X.

The inner mass is further provided with sensing electrodes 317a, also arranged symmetrically with respect to the second axis Y and coupled to respective first stator sensing electrodes 317b and second stator sensing electrode 317c to sense displacements of the inner mass 310 in the sensing direction along the second axis Y, substantially as already described with reference to FIG. 2.

The first outer mass 311 and the second outer mass 312 are provided with respective sets of movable driving electrodes 320a coupled to respective stator driving electrodes 320b and configured to move the first outer mass 311 and the second outer mass 312 in the driving direction along the first axis X.

The first outer mass 311 and the second outer mass 312 are further provided with sensing electrodes 321a coupled to respective first stator sensing electrodes 321b and second stator sensing electrode 321c to sense displacements of the first outer mass 311 and the second outer mass 312 in the sensing direction along the second axis Y, substantially as already described with reference to FIG. 2.

The first additional masses 311a are arranged symmetrically with respect to the first axis X and between the inner mass 310 and the first outer mass 311.

The second additional masses 312a are arranged symmetrically with respect to the first axis X and between the inner mass 310 and the second outer mass 312.

Flexures 318 elastically couple the first additional masses 311a to the inner mass 310 and to the first outer mass 311 and the second additional masses 312a to the inner mass 310 and to the second outer mass 312. The flexures 318 are configured so that the first (second) additional masses 311a (312a) move toward one another when the inner mass 310 and the first (second) outer mass 311 (312) move toward one another and the first (second) additional masses 311a (312a) move away from one another when the inner mass 310 and the first (second) outer mass 311 (312) move away from one another. Driving motion is transmitted to the first additional masses 311a and to the second additional masses 312a by the inner mass 310, the first inner mass 311 and the second outer mass 312 through the flexures 318.

In practice, two beating-heart structures moving in phase opposition are defined in the microstructure 303. Adjacent masses of the two beating-heart structures (i.e. the first mass portion 310' and the second mass portion 310") are rigidly coupled to form the inner mass 310.

The inner mass 310, the first outer mass 311, the second outer mass 312, the first additional masses 311a and the second additional masses 311b are also coupled to the substrate 302 at anchorages 315 through flexure systems 313.

The flexures 318 and flexure systems 313 are moreover configured to allow the inner mass 310, the first outer mass 311, the second outer mass 312, the first additional masses 311a and the second additional masses 312a to move also out of plane along the third axis Z. More precisely, the inner mass 310, the first outer mass 311 and the second outer mass 312 may be displaced by Coriolis forces along the third axis Z in response to rotations about a rotation axis parallel to the second axis Y (FIG. 13); and the first additional masses 311a and the second additional masses 312a may be displaced by Coriolis forces along the third axis Z in response to rotations about a rotation axis parallel to the first axis X (FIG. 14).

Third stator sensing electrodes 322 are provided on the substrate 302 and are each capacitively coupled to a respective one of the inner mass 310, the first outer mass 311, the second outer mass 312, the first additional masses 311a and the second additional masses 312a. Displacements of the inner mass 310, the first outer mass 311, the second outer mass 312, the first additional masses 311a and the second additional masses 312a may be detected through the respective third stator sensing electrodes 322, since capacitive coupling is determined by the distance of the masses from the substrate 302 according to the third axis Z.

The microstructure 303 allows therefore to provide a 3-axis microelectromechanical gyroscope.

Figure 15:
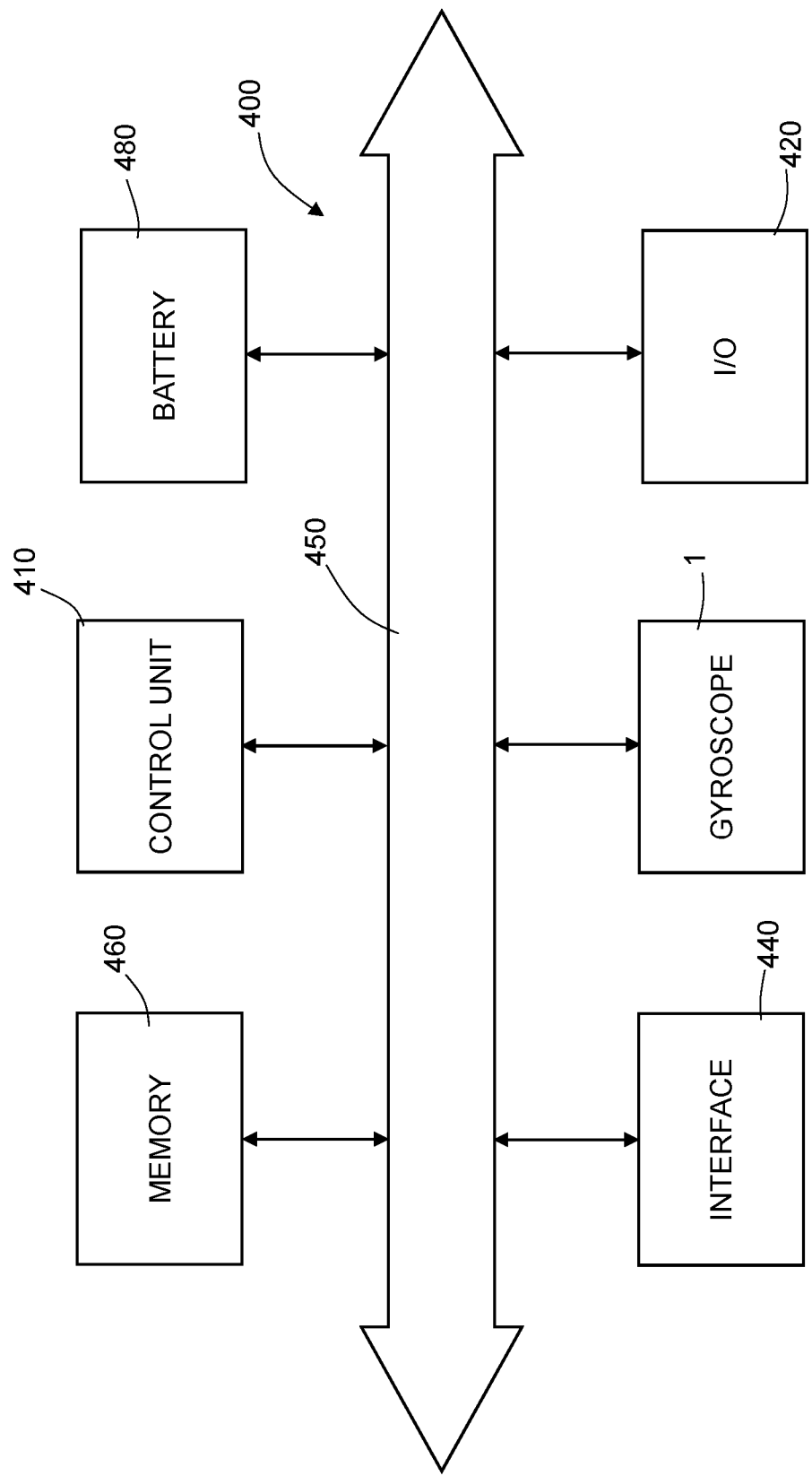
FIG. 15 is a simplified block diagram of an electronic system incorporating a microelectromechanical gyroscope according to the present disclosure.

Illustrated in FIG. 15 is a portion of an electronic system 400 according to an embodiment of the present disclosure. The system 400 incorporates the microelectromechanical gyroscope 1 and may be used in devices such as, for example, a laptop computer or tablet, possibly with wireless-connection capacity, a cellphone, a smartphone, a messaging device, a digital music player, a digital camera, or other devices designed to process, store, transmit, or receive information. In particular, the microelectromechanical gyroscope 1 may be used for performing functions of control, for example, in a motion-activated user interface for computers or consoles for video games or in a satellite-navigation device.

The electronic system 400 may comprise a control unit 410, an input/output (I/O) device 420 (for example, a keyboard or a screen), the gyroscope 1, a wireless interface 440, and a memory 460, of a volatile or nonvolatile type, coupled together through a bus 450. In one embodiment, a battery 480 may be used for supplying the system 400. It should be noted that the scope of the present disclosure is not limited to embodiments necessarily having one or all of the devices listed.

The control unit 410 may comprise, for example, one or more microprocessors, microcontrollers and the like.

The I/O device 420 may be used for generating a message. The system 400 may use the wireless interface 440 for transmitting and receiving messages to and from a wireless-communication network with a radiofrequency (RF) signal. Examples of wireless interface may comprise an antenna, a wireless transceiver, such as a dipole antenna, even though the scope of the present disclosure is not limited from this point of view. Furthermore, the I/O device 420 may supply a voltage representing what is stored either in the form of digital output (if digital information has been stored) or in the form of analog information (if analog information has been stored).

Finally, it is evident that modifications and variations may be made to the microelectromechanical gyroscope and to the method described, without thereby departing from the scope of the present disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A microelectromechanical gyroscope comprising:
a substrate;
a first structure, a second structure and a third structure, each of the first, the second, and the third structures elastically coupled to the substrate to be movable in a driving direction along a first axis, the first structure and the second structure being arranged at opposite sides of the third structure with respect to the first axis; and
a driving system configured to oscillate the first structure and the second structure along the first axis in phase with one another and to oscillate the third structure along the first axis in phase opposition with the first structure and the second structure;
the first structure, the second structure and the third structure being provided with respective sets of movable sensing electrodes configured to be displaced in a sensing direction along a second axis perpendicular to the first axis in response to rotations of the substrate about a third axis perpendicular to the first axis and to the second axis,
wherein the third structure includes a first portion and a second portion rigidly connected to each other, the first portion being symmetric with respect to the first structure, the second portion being symmetric with respect to the second structure.

2. The gyroscope according to claim 1, further comprising:
a plurality of first stator sensing electrodes; and
a plurality of second stator sensing electrodes, wherein each movable sensing electrode is capacitively coupled to a respective one of the first stator sensing electrodes and to a respective one of the second stator sensing electrodes.

3. The gyroscope according to claim 2, wherein the first stator sensing electrodes and the second stator sensing electrodes are arranged so that an overall capacitance between each movable sensing electrode and the respective first stator sensing electrode is different from an overall capacitance between each movable sensing electrode and the respective second stator sensing electrode in response to displacements of one of the first structure, the second structure and the third structure along the second axis either in the sensing direction or opposite to the sensing direction.

4. The gyroscope according to claim 3, comprising a read interface, configured to sense the difference of the overall capacitance between each movable sensing electrode and the respective first stator sensing electrode and the overall capacitance between each movable sensing electrode and the respective second stator sensing electrode.

5. The gyroscope according to claim 4, wherein the read interface has a first input and a second input, the first stator sensing electrodes are electrically coupled to the first input and the second stator sensing electrodes are electrically coupled to the second input.

6. The gyroscope according to claim 2, wherein the first stator sensing electrodes and the second stator sensing electrodes coupled to the movable sensing electrodes of the third structure are configured so that a first capacitance between each movable sensing electrode of the third structure and the respective first stator sensing electrode increases and a second capacitance between each movable sensing electrode of the third structure and the respective second stator sensing electrode decreases in response to displacements of the third structure along the second axis in the sensing direction; and so that the first capacitance decreases and the second capacitance increases in response to displacements of the third structure along the second axis opposite to the sensing direction.

7. The gyroscope according to claim 6, wherein the first stator sensing electrodes and the second stator sensing electrodes coupled to the movable sensing electrodes of the first structure and of the second structure are arranged so that a third capacitance between each movable sensing electrode of the first structure and of the second structure and the respective first stator sensing electrode increases and a fourth capacitance between each movable sensing electrode of the first structure and of the second structure and the respective second stator sensing electrode decreases in response to displacements of the first structure and of the second structure along the second axis opposite to the sensing direction; and so that the third capacitance decreases and the fourth capacitance increases in response to displacements of the first structure and of the second structure along the second axis in the sensing direction.

8. The gyroscope according to claim 1, wherein the movable sensing electrodes are arranged symmetrically with respect to the first axis.

9. The gyroscope according to claim 1, wherein the movable sensing electrodes of the first structure and of the second structure are arranged symmetrically with respect to the second axis.

10. The gyroscope according to claim 9, wherein the first structure and the second structure are symmetric with respect to the second axis.

11. The gyroscope according to claim 1, wherein the movable sensing electrodes of the third structure are arranged symmetrically with respect to an axis parallel to the second axis and passing through a center of mass of the third structure.

12. The gyroscope according to claim 11, wherein the third structure is symmetric with respect to the axis parallel to the second axis and passing through a center of mass of the third structure.

13. The gyroscope according to claim 1, wherein the first portion and the second portion of the third structure are symmetric with respect to one another.

14. The gyroscope according to claim 1, wherein each of the first portion, the second portion, the first structure and the second structure comprises:
a respective driving frame of a plurality of driving frames;
a respective sensing mass of a plurality of sensing masses;
a respective sensing frame of a plurality of sensing frames;
the driving frames being elastically coupled to the substrate to oscillate along the first axis and supporting respective movable driving electrodes in capacitive coupling with respective stator driving electrodes of the substrate.

15. The gyroscope according to claim 14, comprising:
first flexures that elastically couple the sensing masses to the respective driving frames, the first flexures being configured to allow one relative degree of freedom in the sensing direction in accordance with the second axis and prevent relative motion in the driving direction along the first axis;
second flexures that elastically couple the sensing frames to the respective sensing masses, the second flexures being configured to allow one relative degree of freedom in the driving direction along the first axis and prevent relative motion in the sensing direction in accordance with the second axis; and
third flexures that elastically couple the sensing frames to the substrate, the third flexures being configured to allow motion with respect to the substrate in the sensing direction, along the second axis.

16. An electronic system comprising:
a gyroscope that includes:
a substrate;
a first structure, a second structure and a third structure, each of the first, the second, and the third structures elastically coupled to the substrate to be movable in a driving direction along a first axis, the first structure and the second structure being arranged at opposite sides of the third structure with respect to the first axis; and
a driving system configured to oscillate the first structure and the second structure along the first axis in phase with one another and to oscillate the third structure along the first axis in phase opposition with the first structure and the second structure;
the first structure, the second structure and the third structure being provided with respective sets of movable sensing electrodes configured to be displaced in a sensing direction along a second axis perpendicular to the first axis in response to rotations of the substrate about a third axis perpendicular to the first axis and to the second axis; and
a control unit configured to control the gyroscope,
wherein the third structure includes a first portion and a second portion directly connected to each other along an entire length between a first side and an opposite second side of the third structure, the first portion being symmetric with respect to the first structure, the second portion being symmetric with respect to the second structure.

17. The electronic system according to claim 16, wherein the gyroscope includes:
- a plurality of first stator sensing electrodes; and
- a plurality of second stator sensing electrodes, wherein each movable sensing electrode is capacitively coupled to a respective one of the first stator sensing electrodes and to a respective one of the second stator sensing electrodes.

18. A method of sensing an angular rate comprising:
- oscillating a first structure and a second structure in phase with one another, the first and second structures being elastically supported by a substrate along a first axis relative to the substrate;
- oscillating a third structure along the first axis relative to the substrate, in phase opposition with the first structure and the second structure, the third structure being arranged between the first structure and the second structure and elastically supported by the substrate, the third structure having a first portion and a second portion rigidly connected to each other, the first portion being symmetric with respect to the first structure, the second portion being symmetric with respect to the second structure;
- sensing displacements of respective sets of movable sensing electrodes of the first structure, of the second structure and of the third structure, the movable sensing electrodes being configured to be displaced in a sensing direction along a second axis perpendicular to the first axis in response to rotations of the substrate about a third axis perpendicular to the first axis and to the second axis.

19. The method according to claim 18, wherein the sensing includes sensing a difference of an overall capacitance between each movable sensing electrode and a respective first stator sensing electrode and an overall capacitance between each movable sensing electrode and a respective second stator sensing electrode.

20. The electronic system of claim 16 wherein the first portion and the second portion of the third structure are symmetric with respect to one another.

* * * * *